US012429178B1

(12) United States Patent
Su

(10) Patent No.: US 12,429,178 B1
(45) Date of Patent: Sep. 30, 2025

(54) KITE-SHAPED DECORATIVE LAMP

(71) Applicant: Lin Su, Hunan (CN)

(72) Inventor: Lin Su, Hunan (CN)

( * ) Notice: Subject to any disclaimer, the term of this patent is extended or adjusted under 35 U.S.C. 154(b) by 0 days.

(21) Appl. No.: 19/213,184

(22) Filed: May 20, 2025

(30) Foreign Application Priority Data

Apr. 29, 2025 (CN) ......................... 202520846344.8

(51) Int. Cl.

| | |
|---|---|
| ***F21S 4/26*** | (2016.01) |
| ***F21S 9/03*** | (2006.01) |
| ***F21V 17/08*** | (2006.01) |
| ***F21V 23/00*** | (2015.01) |
| *F21Y 103/30* | (2016.01) |
| *F21Y 115/10* | (2016.01) |

(52) U.S. Cl.
CPC ................. *F21S 4/26* (2016.01); *F21S 9/035* (2013.01); *F21V 17/08* (2013.01); *F21V 23/008* (2013.01); *F21Y 2103/30* (2016.08); *F21Y 2115/10* (2016.08)

(58) Field of Classification Search
CPC ...... F21S 4/26; F21S 9/035; F21S 4/22; F21S 4/20; F21S 4/00; F21V 17/08; F21V 23/008; F21V 21/00; F21V 21/008; F21V 23/007; F21Y 2103/30; F21Y 2115/10; F21W 2121/00; F21W 2121/004
See application file for complete search history.

(56) References Cited

U.S. PATENT DOCUMENTS

| | | | | |
|---|---|---|---|---|
| 5,000,402 A * | 3/1991 | Blackburn | F21V 33/008 | 362/802 |
| 5,528,476 A * | 6/1996 | Fenton | F21V 21/002 | 362/195 |
| 6,168,115 B1 * | 1/2001 | Abdelkhaleq | A63H 27/08 | 362/253 |
| 7,523,910 B2 * | 4/2009 | Moran | F16G 11/048 | 24/298 |
| 12,188,627 B1 * | 1/2025 | Su | F21V 17/108 | |

* cited by examiner

*Primary Examiner* — Bao Q Truong
(74) *Attorney, Agent, or Firm* — HOWARD M COHN and Associates, LLC

(57) ABSTRACT

A kite-shaped decorative lamp includes a decorative body, a hanging assembly, and a pulling light string. The hanging assembly is connected to an upper surface of the decorative body and configured to hang the decorative body. An upper end of the pulling light string is connected to a lower surface of the decorative body, and a lower end of the pulling light string extends downward. The hanging assembly and the pulling lamp string jointly act on the decorative body to maintain a hovering posture of the decorative body.

19 Claims, 6 Drawing Sheets

KITE-SHAPED DECORATIVE LAMP

TECHNICAL FIELD

The present disclosure relates to a technical field of decorative lamps, and in particular to a kite-shaped decorative lamp.

BACKGROUND

When a conventional kite-shaped decorative lamp is hung, a main body of the kite-shaped decorative lamp flies in the air by a hanging rope. Under an action of wind, the main body is easy to tilt or shake in various directions.

SUMMARY

The present disclosure provides a kite-shaped decorative lamp, which reduces a tilting degree or a shaking degree of the kite-shaped decorative lamp.

The kite-shaped decorative lamp comprises a decorative body, a hanging assembly, and a pulling light string. The hanging assembly is connected to an upper surface of the decorative body and configured to hang the decorative body. An upper end of the pulling light string is connected to a lower surface of the decorative body, and a lower end of the pulling light string extends downward. The hanging assembly and the pulling lamp string jointly act on the decorative body to maintain a hovering posture of the decorative body.

In some embodiments, the decorative body comprises flexible wind-receiving layer and a foldable skeleton attached to the flexible wind-receiving layer. The foldable skeleton is configured to support or fold the flexible wind-receiving layer. A lower end of the hanging assembly is connected to the foldable skeleton. The upper end of the pulling light string is connected to at least one of the foldable skeleton and the flexible wind-receiving layer.

In some embodiments, the flexible wind-receiving layer comprises two wings, and the decorative body is capable of switching between an unfolded state and a folded state. In the unfolded state, free ends of the two wings are away from each other, and the flexible wind-receiving layer is unfolded to form a kite-shaped plane structure. In the folded state, the two wings are folded to form a multi-stage umbrella-shaped wrinkle structure.

In some embodiments, the foldable skeleton is approximately I-shaped and is axially symmetric. The foldable skeleton comprises a central support and a support frame. The central support extends in a vertical direction. The support frame comprises a front support structure and a rear support structure. The front support structure is connected to a first end of the central support. The rear support structure is connected to a second end of the central support. The two wings are respectively disposed on two sides of the central support. The front support structure is configured to support or fold head portions of the two wings. The rear support structure is configured to support or fold tail portions of the two wings. The hanging assembly is connected to the central support.

In some embodiments, the support frame comprises a front support and a rear support. A middle portion of the front support is detachably connected to the first end of the central support to form the front support structure. A middle portion of the rear support is detachably connected to the second end of the central support to form the rear support structure.

In some embodiments, the foldable skeleton comprises a left support and a right support. The left support is bent to define a first support rod, a second support rod, and a third support rod. The first support rod, the second support rod, and the third support rod are connected in sequence. The right support is bent to define a fourth support rod, a fifth support rod, and a sixth support rod. The fourth support rod, the fifth support rod, and the sixth support rod are connected in sequence.

The second support rod and the fifth support rod are disposed in parallel. The second support rod is fixed relative to the fifth support rod, and the first support rod and the fifth support rod jointly form the central support. An extension direction of the first support rod is opposite to an extension direction of the fourth support rod, and the first support rod and the fourth support rod jointly form the front support structure. An extension direction of the third support rod is opposite to an extension direction of the sixth support rod, and the third support rod and the sixth support rod jointly form the rear support structure.

In some embodiments, the hanging assembly comprises a hanging rope and a hook. A first end of the hanging rope is connected to an upper half portion of the central support. A second end of the hanging rope is connected to a lower half portion of the central support. The hook is connected to the hanging rope.

In some embodiments, the hanging assembly further comprises an adjusting piece slidably connected to the hanging rope, and the adjusting piece is configured to fix the hook at different positions of the hanging rope, so as to adjust a posture of the decorative body.

In some embodiments, the hook comprises a first hook body, a second hook body, and a rotating connector. The first hook body is connected to the hanging rope, the second hook body is connected to an external structure, and the rotating connector connects the first hook body to the second hook body, so that the first hook body and the second hook body are rotatable relative to each other.

In some embodiments, the foldable skeleton is made of a metal or an alloy having a shape memory characteristic, so that the decorative body is capable of switching between the unfolded state and the folded state.

In some embodiments, the foldable skeleton comprises any one of iron wires, aluminum wires, copper wires and silver wires.

In some embodiments, a connection method of the flexible wind-receiving layer and the foldable skeleton comprises a bonding connection, a sewing connection, a fastener connection, a Velcro connection, or a zipper connection.

In some embodiments, the kite-shaped decorative lamp further comprises an illumination piece. The illumination piece is a part of the pulling light string, and the part of the pulling light string disposed on the decorative body is configured as the illumination piece.

In some embodiments, at least a portion of the flexible wind-receiving layer connected to the pulling light string is a double-layer structure. The pulling light string is sandwiched between two layers of the double-layer structure.

In some embodiments, the pulling light string is at least disposed around an outer contour of the decorative body.

In some embodiments, the kite-shaped decorative lamp further comprises a control device. The control device is electrically connected to the pulling lamp string and is configured to control a light-emitting operation of the pulling lamp string.

In some embodiments, the pulling light string comprises a conductive wire, light-emitting diode (LED) lamp beads, and a protective sleeve. The LED lamp beads are disposed at intervals along an extension direction of the conductive wire. The protective sleeve is sleeved outside the conductive wire and the LED lamp beads.

In some embodiments, the control device is configured to control a color of light emitted by the LED lamp beads and/or a flashing frequency of the LED lamp beads.

In some embodiments, the kite-shaped decorative lamp further comprises a battery, and the battery is configured to supply power to the control device and the pulling light string.

In some embodiments, the battery is a solar cell.

In the present disclosure, the decorative body is allowed to be hung at any position through the hanging assembly, the first end of the pulling light string is connected to the bottom portion of the decorative body, and the second end of the pulling light string is pulled downward. For example, the pulling light string pulls the decorative body downward under gravity, or the second end of the pulling light string is connected to the ground, a bracket, or a root of a tree. In this way, the decorative body is subjected to an upward force from the hanging assembly and a downward pulling force of the pulling light string, thereby forming a stable suspension structure. Thus, the decorative body maintains a hovering posture. As a result, the kite-shaped decorative lamp maintains a good display effect. In addition, the pulling light string has both a pulling function and a lighting effect, which simplifies a structure of the kite-shaped decorative lamp and improves decorativeness. The pulling light string is further able to emit light at night to present a dynamic light strip.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

1-kite-shaped decorative lamp; 10-decorative body; 110-foldable skeleton; 111-front support; 112-rear support; 113-central support; 114-left support; 1141-first support rod; 1142-second support rod; 1143-third support rod; 115-right support; 1151-fourth support rod; 1152-fifth support rod; 1153-sixth support rod; 120-flexible wind-receiving layer; 121-left wing; 122-right wing; 123-streamer; 20-illumination piece; 30-hanging assembly; 31-hanging rope; 32-hook; 321-first hook body; 322-second hook body; 323-rotating connector; 33-adjusting piece; 40-pulling light string; 41-conducting wire; 42-LED lamp bead; 43-protective sleeve; 50-control device; 60-battery.

The realization of the objectives, functional features and characteristics of the present disclosure are further described in conjunction with embodiments and the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as “first” and “second” are only used for the purpose of description, rather than being understood to indicate or imply relative importance or hint the number of indicated technical features. Thus, the feature limited by “first” and “second” can explicitly or impliedly include at least one feature. Unless otherwise indicated, the term “a plurality of” means two or more. The term “and/or” depict relationship between associated objects and there are three relationships thereon. For example, A and/or B may indicate A exists alone, A and B exist at the same time, and B exists alone. The character “/” generally indicates that the associated object is alternative. The terms “first”, “second”, “third”, etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term “and/or” includes any and all combinations of one or more of the associated listed items.

Figure 1:
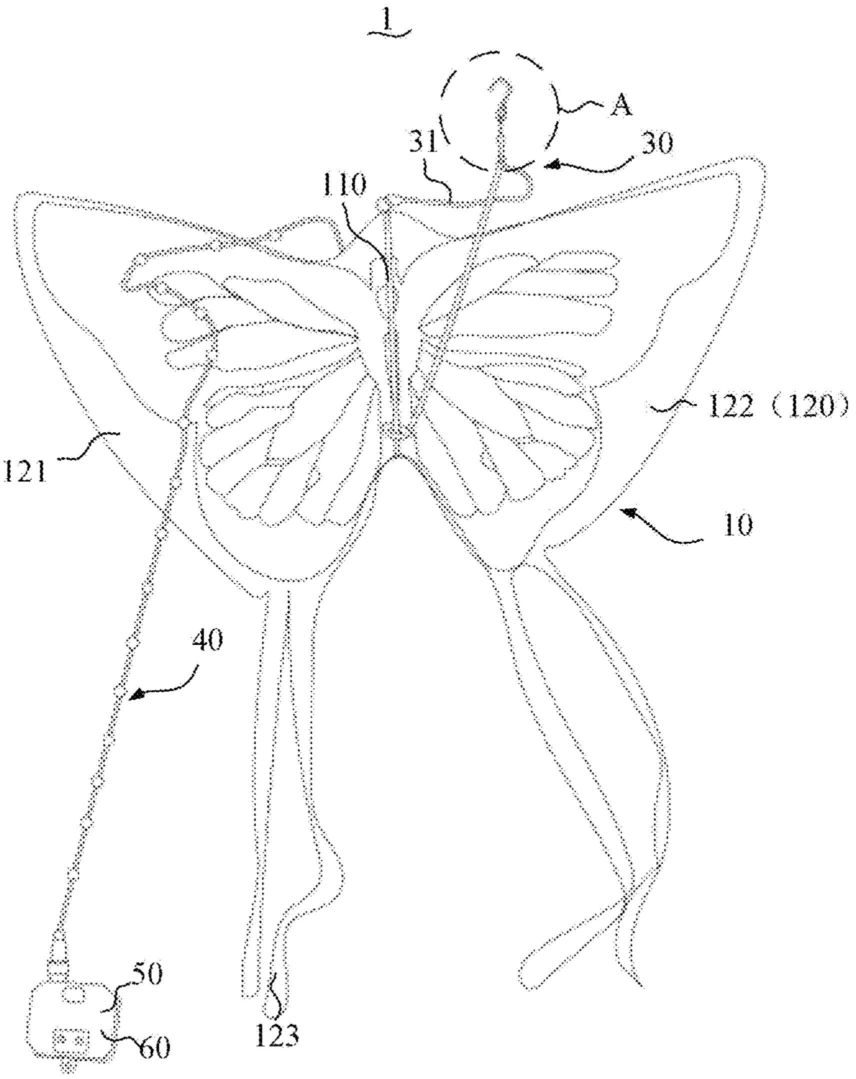
FIG. 1 is a schematic diagram of a kite-shaped decorative lamp in an unfolded state according to one embodiment of the present disclosure.
Figure 2:
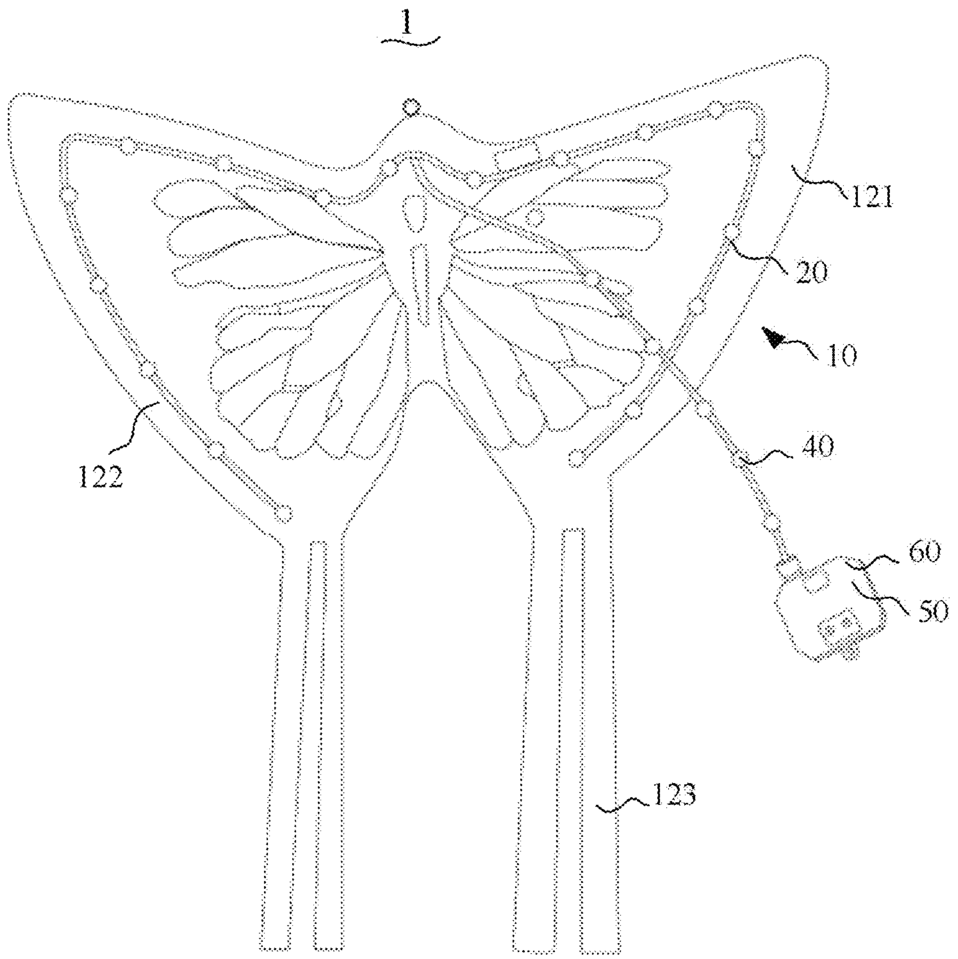
FIG. 2 is another schematic diagram of the kite-shaped decorative lamp in the unfolded state according to one embodiment of the present disclosure.
Figure 3:
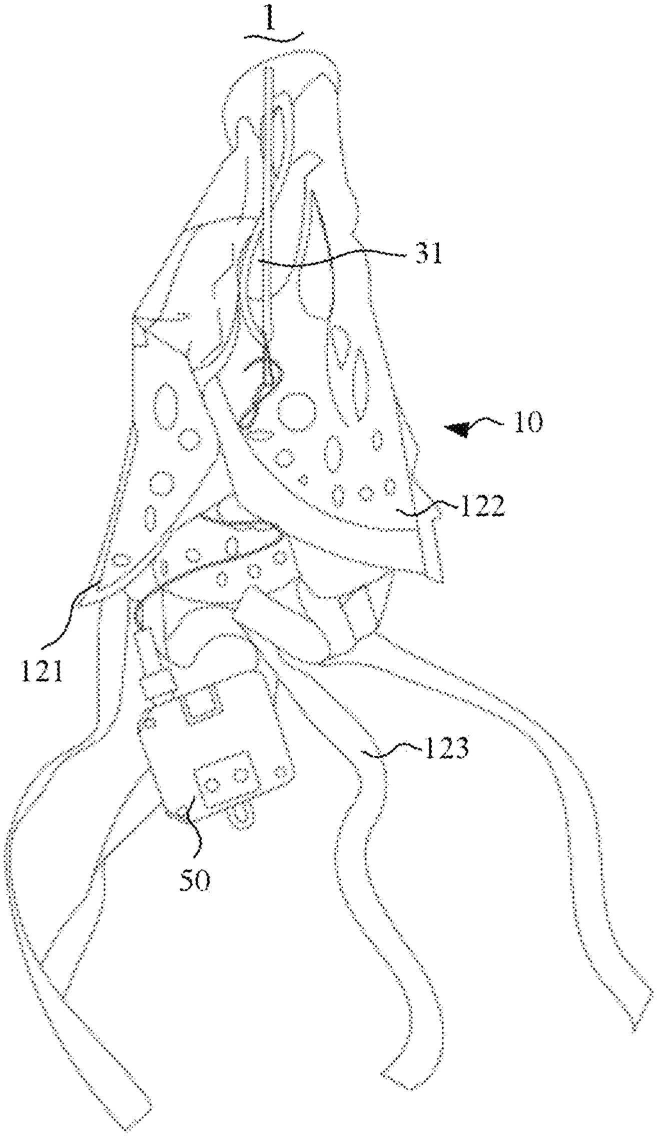
FIG. 3 is a schematic diagram of the kite-shaped decorative lamp in a folded state according to one embodiment of the present disclosure.

As shown in FIGS. 1-3, the present disclosure provides a kite-shaped decorative lamp 1. The kite-shaped decorative lamp 1 comprises a decorative body 10, a illumination piece 20, a hanging assembly 30, and a pulling light string 40.

Figure 4:
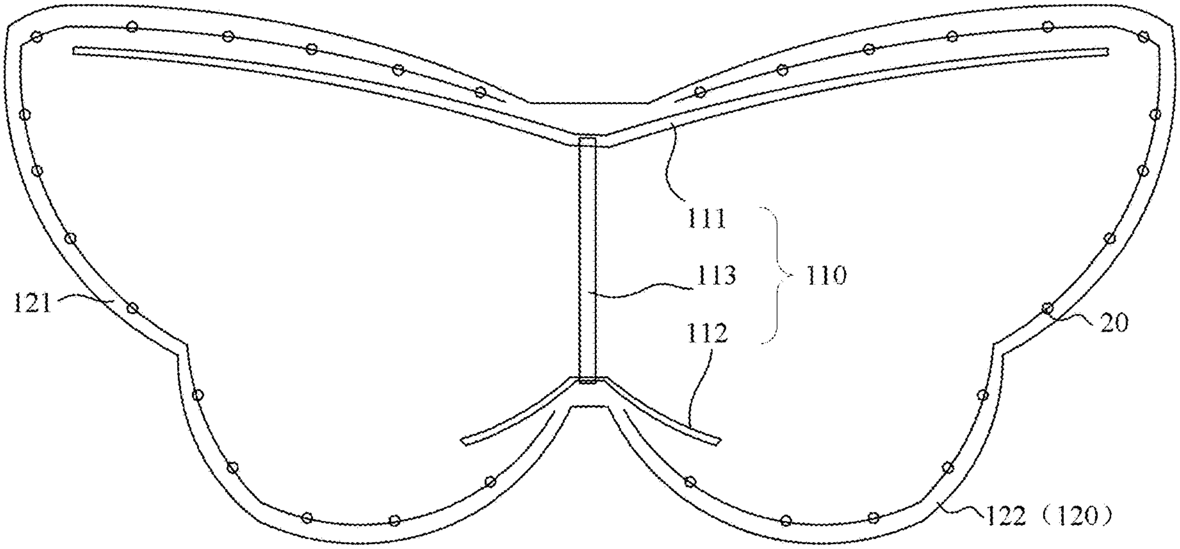
FIG. 4 is a schematic diagram of a first embodiment of a foldable skeleton according to one embodiment of the present disclosure.
Figure 5:
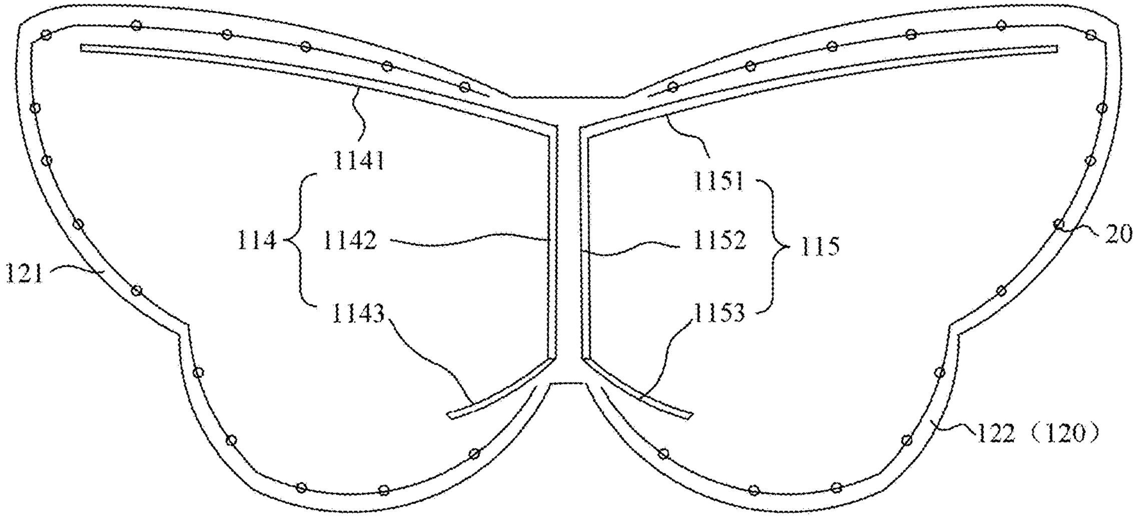
FIG. 5 is a schematic diagram of a second embodiment of the foldable skeleton according to one embodiment of the present disclosure.

As shown in FIGS. 4 and 5, the decorative body 10 is in a kite shape. The decorative body 10 comprises a foldable skeleton 110 and a flexible wind-receiving layer 120. The flexible wind-receiving layer 120 is in a form of a fabric cloth, a plastic film, etc., to provide rich colors and patterns for the kite-shaped decorative lamp 1. The illumination piece 20 is disposed on the decorative body 10 so that the decorative body 10 is able to emit light. The foldable skeleton 110 is a support structure of the decorative body 10 and is connected to the flexible wind-receiving layer 120. The foldable skeleton 110 is configured to support the flexible wind-receiving layer 120 so that the flexible wind-receiving layer 120 is unfolded to form a kite style. The hanging assembly 30 is connected to a top portion of the decorative body 10 and is configured to hang the decorative body 10 in the air. The hanging assembly 30 is connected to the foldable skeleton 110. A first end of the pulling light string 40 is connected to a bottom portion of the decorative body 10, and a second end of the pulling light string 40 is connected to an external structure to pull the decorative body 10.

In the present disclosure, the decorative body 10 is allowed to be hung at any position through the hanging assembly 30, and the illumination piece 20 is disposed on the decorative body 10, so that the decorative body is able to emit light in the dark. The first end of the pulling light string 40 is connected to the bottom portion of the decorative body 10, and the second end of the pulling light string 40 is pulled downward. For example, the pulling light string 40 pulls the decorative body 10 downward under gravity, or the second end of the pulling light string 40 is connected to the ground, a bracket, or a root of a tree. In this way, the decorative body 10 is subjected to an upward force from the hanging assembly 20 and a downward pulling force of the pulling light string 40, thereby forming a stable suspension structure. Thus, the decorative body 10 maintains the hovering posture. As a result, the kite-shaped decorative lamp maintains a good display effect. In addition, the pulling light string 40 has both a pulling function and a lighting effect, which simplifies a structure of the kite-shaped decorative lamp and improves decorativeness. The pulling light string is further able to emit light at night to present a dynamic light strip.

Optionally, a connection method of the flexible wind-receiving layer 120 and the foldable skeleton 10 comprises a bonding connection, a sewing connection, a fastener connection, a Velcro connection, or a zipper connection.

The bonding connection makes the decorative body present a relatively flat and seamless appearance, so that the flexible wind-receiving layer is tightly connected to the foldable skeleton 110 and is not easy to fall off. In addition, the bonding connection is relatively simple and fast, which is suitable for large-scale production. The sewing connection fixes the flexible wind-receiving layer 120 and the foldable skeleton 110 together through stitches, and has high durability and stability. In addition, can a density and a pattern of the stitches are allowed to be adjusted in the sewing connection as needed to increase the aesthetics of the decorative body 10. The fastener connection has characteristics of fast assembly and disassembly, without using glue, needle, or thread, thereby reducing difficulty and time cost of assembly. In addition, the fastener connection further realizes a rapid replacement of the flexible wind-receiving layer, increasing flexibility and maintainability of the decorative body 10. A fastener used in the fastener connection may be a cable tie, or the fastener may comprise two buckling structures, where a first buckling structure is fixed on the foldable skeleton 110, and a second buckling structure is fixed on the flexible wind-receiving layer 120. By buckling the two buckling structures together, the fastener connection is realized.

Optionally, the flexible wind-receiving layer 120 is detachably connected to the foldable skeleton 110, so that the flexible wind-receiving layer 120 and the foldable skeleton 110 are easily separated, which is convenient for cleaning, maintenance, and replacement of the decorative body 10. In addition, the user is allowed to replace different flexible wind-receiving layers 120 according to personal preferences and needs. A detachable connection method comprises the fastener connection, and further comprises the Velcro connection, the zipper connection, and other forms. For example, the Velcro connection utilizes two interacting sheet structures. Namely, a hooking pad thereof has hook-like fibers and a suede pas thereof has soft loop-like fibers. One of the two pads is fixed on the foldable skeleton 110, and the other one of the two pads is fixed on the flexible wind-receiving layer 120. When the two pads are attached together, the two pads are firmly bonded together, and the two pads are separated by gently tearing the two pads apart. Alternatively, a mounting cavity is disposed on the flexible wind-receiving layer 120 for accommodating the foldable skeleton 110. The foldable skeleton 110 only needs to be mounted in the mounting cavity and then sealed with a zipper, so that the foldable skeleton 110 is firmly fixed in the mounting cavity.

There are many folding forms for the foldable skeleton 110.

The foldable skeleton 110 is made of a metal or an alloy having a shape memory characteristic, so that the flexible wind-receiving layer 120 is capable of switching between an unfolded state and a folded state, which greatly facilitates the unfolding, use and storage of the kite-shaped decorative lamp 1. There are multiple choices for a material of the foldable skeleton 110, such as iron wires, aluminum wires, copper wires, silver wires, etc. The iron wires are cheap and have sufficient strength and toughness to withstand certain external forces. The aluminum wires are soft, easy to bend and shape, and are able to easily create various complex decorative shapes. Moreover, the aluminum wires do not rust and have good corrosion resistance, which maintains the long-term beauty of the kite-shaped decorative lamp 1. The copper wires have good ductility and are easy to bend and shape. In addition, the copper wires also have a certain corrosion resistance, maintain stable performance in a humid environment, and extend service life of the kite-shaped decorative lamp 1. The silver wires have extremely high gloss and present an elegant and noble visual effect. Further, the silver wires also have good ductility and plasticity, and are easily made into various exquisite shapes.

Since the foldable skeleton 110 is bendable, there may be certain dimensional deviations during a manufacturing and assembly process, resulting in an axisymmetric arrangement of the foldable skeleton 110 not being accurate. However, such slight error is acceptable and does not adversely affect the overall stability and a decorative effect of the foldable skeleton 110.

Of course, in other embodiments, the foldable skeleton 110 is in a foldable form by making from a material other than the metal or the alloy (such as but not limited to Polyoxymethylene (POM), Polypropylene (PP), etc.), a folding assembly and a hinge mechanism. The foldable skeleton 110 is detachable to realize easy switching of the flexible wind-receiving layer 120 between the unfolded state and the folded state. The POM is a tough and elastic material with excellent mechanical properties, including tensile strength, compressive strength and hardness, outstanding rigidity and bending fatigue resistance. The POM comprises both homopolymer materials and copolymers. Homopolymer materials and have good ductility and fatigue resistance.

The foldable skeleton 110 comprises main support rods, connecting rod mechanisms, and hinge mechanisms. The hinge mechanisms are connected between the main support rods and between the connecting rod mechanisms and the main support rods to form a foldable linkage structure. In the unfolded state, the main support rods unfold and drive the connecting rod mechanisms to move. The connecting rod mechanisms support and fix the main support rods in a fully unfolded position through a linkage of the hinge mechanisms. In the folded state, the main support rods drive the connecting rod mechanisms to retract through folding movements of the hinge mechanisms, so that the foldable skeleton 110 is folded to a compact state as a whole. It is understood that a self-locking buckle is disposed on one end of each of the connecting rod mechanisms. When the foldable skeleton 110 is fully unfolded, each self-locking buckle is automatically locked to prevent the foldable skeleton 110 from being accidentally folded. When it is necessary to fold the foldable skeleton 110, each self-locking buckle is released.

To realize a detachable design of the foldable skeleton 110, the foldable skeleton 110 is divided into different parts through a modular design. For instance, the foldable skeleton 110 comprises a central support frame, a wing support frame, connecting rods, etc., which are connected in one or more of the following method to realize the detachable design of the foldable skeleton 110, such as a snap-fit connection, a threaded connection, a magnetic connection, and a plug-in connection. In the unfolded state, the user assembles the various parts in a predetermined order and fixes the parts with connectors or fasteners to form a complete support structure. In the stored state, a volume and an occupied space of the kite-shaped decorative lamp 1 are greatly reduced by simply disassembling the parts of the foldable skeleton 110, which is convenient for carrying and storage. The present disclosure does not limit the specific form of the flexible wind-receiving layer 120 capable of switching between the unfolded state and the folded state.

In order to improve hanging stability of the decorative body 10, the decorative body 10 is axially symmetric. Correspondingly, the foldable skeleton 110 is axially symmetric. Specifically, the foldable skeleton 110 is approximately I-shaped. The foldable skeleton 110 comprises a central support 113 and a support frame. The central support 113 extends in a vertical direction. The support frame comprises a front support structure and a rear support structure. The front support structure is connected to a first end of the central support 113. The rear support structure is connected to a second end of the central support 113. A lower end of the hanging assembly 30 is connected to the central support 113, so that a hanging point is a center of the decorative body 10, making the kite-shaped decorative lamp balanced and enhancing the stability of the decorative body 10. The decorative body 10 maintains a relatively stable state under an action of an external environment (such as wind), a possibility of shaking or tilting is effectively reduced, and the hovering posture is maintained. An upper end of the pulling light string 40 is connected to the foldable skeleton 110. Alternatively, the upper end of the pulling light string 40 is connected to the flexible wind-receiving layer 120. Alternatively, the upper end of the pulling light string 40 is connected to the foldable skeleton 110 and the flexible wind-receiving layer 120 at the same time.

The flexible wind-receiving layer 120 comprises two wings, that is, a left wing 121 and a right wing 122. The kite-shaped decorative lamp 1 is capable of switching between the unfolded state and the folded state. The two wings are respectively disposed on two sides of the central support 113. The front support structure is configured to support or fold head portions of the two wings. The rear support structure is configured to support or fold tail portions of the two wings. The hanging assembly is connected to the central support.

As shown in FIGS. 1 and 2, in the unfolded state, free ends of the two wings are away from each other, and the flexible wind-receiving layer 120 is unfolded to form a kite-shaped plane structure. Since the decorative body 10 is in a suspended state when in use, the flexible wind-receiving layer 120 presents a dynamic effect of flying in the air driven by the wind, which is similar to a shape of a flying kite. As shown in FIG. 3, in the folded state, the two wings are folded to form a multi-stage umbrella-shaped wrinkle structure.

Optionally, the flexible wind-receiving layer 120 further comprises streamers 123 respectively connected to a tail portion of the left wing 121 and a tail portion of the right wing 122. The streamers 123 flutter at will under the action of the wind, thereby increasing the aesthetics of the kite-shaped decorative lamp 1.

It is understood that the flexible wind-receiving layer 120 is made from a flexible material. The foldable skeleton 110 has the unfolded state and the folded state, so that the flexible wind-receiving layer 120 has the unfolded state and the folded state. In the unfolded state, the foldable skeleton 110 is fully unfolded to form a stable support frame to ensure that the flexible wind-receiving layer 120 is fully unfolded. When the kite-shaped decorative lamp 1 needs to be stored or transported, the foldable skeleton 110 is folded into a compact structure, which not only greatly reduces a space occupied by the kite-shaped decorative lamp 1, but also allows the user to easily carry and store the kite-shaped decorative lamp 1. In addition, the kite-shaped decorative lamp 1 in the folded state is safer and more reliable and effectively avoids damage that may be caused by bumps or squeezing during transportation.

As shown in FIG. 4, in some embodiments, the support frame comprises a front support 111 and a rear support 112. A middle portion of the front support 111 is detachably connected to the first end of the central support 113 to form the front support structure. The front support structure is configured to support the head portions of the two wings, that is, the front support structure is configured to support a head portion of the left wing 121 and a head portion of the right wing 122. A middle portion of the rear support 112 is detachably connected to the second end of the central support 113 to form the rear support structure. The rear support structure is configured to support the tail portions of the two wings, that is, the rear support structure is configured to support the tail portion of the left wing 121 and the tail portion of the right wing 122.

Specifically, when the foldable skeleton 110 needs to be unfolded, the central support 113 is connected and mounted to the middle portion of the front support 111 and the middle portion of the rear support 112, so that the central support 113, the front support 111, and the rear support 112 form the stable support structure. When the foldable skeleton 110 needs to be stored, the central support 113 is removed, then the front support 111 and the rear support 112 are bendable at any position. In some embodiments, the front support 111 is bent in the middle portion thereof, that is, the front support 111 is bent at a position connected to the central support 113, so that the free ends of the two wings move toward each other. In the fully folded state, the free ends of the two wings are tightly fitted or overlapped to form a compact multi-layer structure, so that the decorative body 10 is allowed to be stored. The decorative body 10 may be in a style of an animal or a doll, such as a butterfly, a bird, a bees, etc. At this time, the front support 111 is relatively long, while the rear support 112 is relatively short. Therefore, it only needs to fold the front support 111 to switch the decorative body to the folded state, and the front support 111 is only bent in the middle portion, so that there are fewer bending points and unnecessary deformation is reduced. Therefore, the front support 111 generally maintains a straight shape to enhance a supporting effect.

The central support 113 is detachably connected to the front support 111 and the rear support 112 by means of, but not limited to, the snap-fit connection, the threaded connection, the plug-in connection, etc. In the embodiment, less support material is used to fully unfold the flexible wind-receiving layer 120 and to realize stable support of the flexible wind-receiving layer 120. The front support 111, the rear support 112, and the central support 113 together form a simple and stable support frame.

In some embodiments, as shown in FIG. 5, the foldable skeleton 110 comprises a left support 114 and a right support 115. The left support 114 is bent to define a first support rod 1141, a second support rod 1142, and a third support rod 1143. The first support rod 1141, the second support rod 1142, and the third support rod 1143 are connected in sequence. The right support 115 is bent to define a fourth support rod 1151, a fifth support rod 1152, and a sixth support rod 1153. The fourth support rod 1151, the fifth support rod 1152, and the sixth support rod 1153 are connected in sequence. The second support rod 1142 and the fifth support rod 1152 are disposed in parallel. The second support rod 1142 is fixed relative to the fifth support rod 1152, and the first support rod 1142 and the fifth support rod 1152 jointly form the central support 113. In this way, the central support 113 forms a double support for the decorative body 10, which enhances a load-bearing capacity and a wind resistance of the foldable skeleton 110. The hanging assembly 30 is connected to the second support rod 1142 and the fifth support rod 1152. An extension direction of the first support rod 1141 is opposite to an extension direction of the fourth support rod 1151, and the first support rod 1141 and the fourth support rod 1151 jointly form the front support structure. An extension direction of the third support rod 1143 is opposite to an extension direction of the sixth support rod 1153, and the third support rod 1143 and the sixth support rod 1153 jointly form the rear support structure.

The left support 114 is configured to support the left wing 121, and the right support 115 is configured to support the right wing 122. By adjusting the left support 114 and the right support 115, the unfolded state and the folded state of the two wings are adjusted. When folding, the left support 114 and the right support 115 are flipped and overlapped with each other, so that the first support rod 1141 and the fourth support rod 1151 move toward each other, the third support rod 1143 and the sixth support rod 1153 move toward to each other; the first support rod 1141 and the second support rod 1142 are bent, and the fourth support rod 1151 and the fifth support rod 1152 are bent, so that the left support 114 and the right support 115 are folded to the folded state. In the embodiment, since the left support 114 and the right support 115 are bendable, the user is able to adjust bending angles and positions thereof according to actual needs to form the foldable skeleton 110 of the kite-shaped decorative lamp 1 that of a specific shape and size.

furthermore, the second support rod 1142 and the fifth support rod 1152 are intertwined with each other, are fixed by another iron wire, or are relatively fixed by fixing glue or dot-shaped double-sided adhesive tapes. The second support rod 1142 and the fifth support rod 1152 are relatively fixed in a circumferential direction and are not rotatable relatively. Alternatively, the second support rod 1142 and the fifth support rod 1152 are rotatable in the circumferential direction. However, there is a certain friction force between the second support rod 1142 and the fifth support rod 1152 and external fixing pieces to prevent rotation. The friction force resists the wind force so that the decorative body 10 remains in the unfolded state and maintains the hovering posture in the wind. When the user manually folds the decorative body 10, a force applied by the user resists the friction force, so the second support rod 1142 and the fifth support rod 1152 are folded and overlapped. However, the present disclosure does not limit a connection method of the second support rod 1142 and the fifth support rod 1152.

The first support rod 1141, the third support rod 1143, the fourth support rod 1151, and the sixth support rod 1153 may be in a form of straight rods or may be bent so as to form the foldable skeleton 110 of a specific shape.

Figure 6:
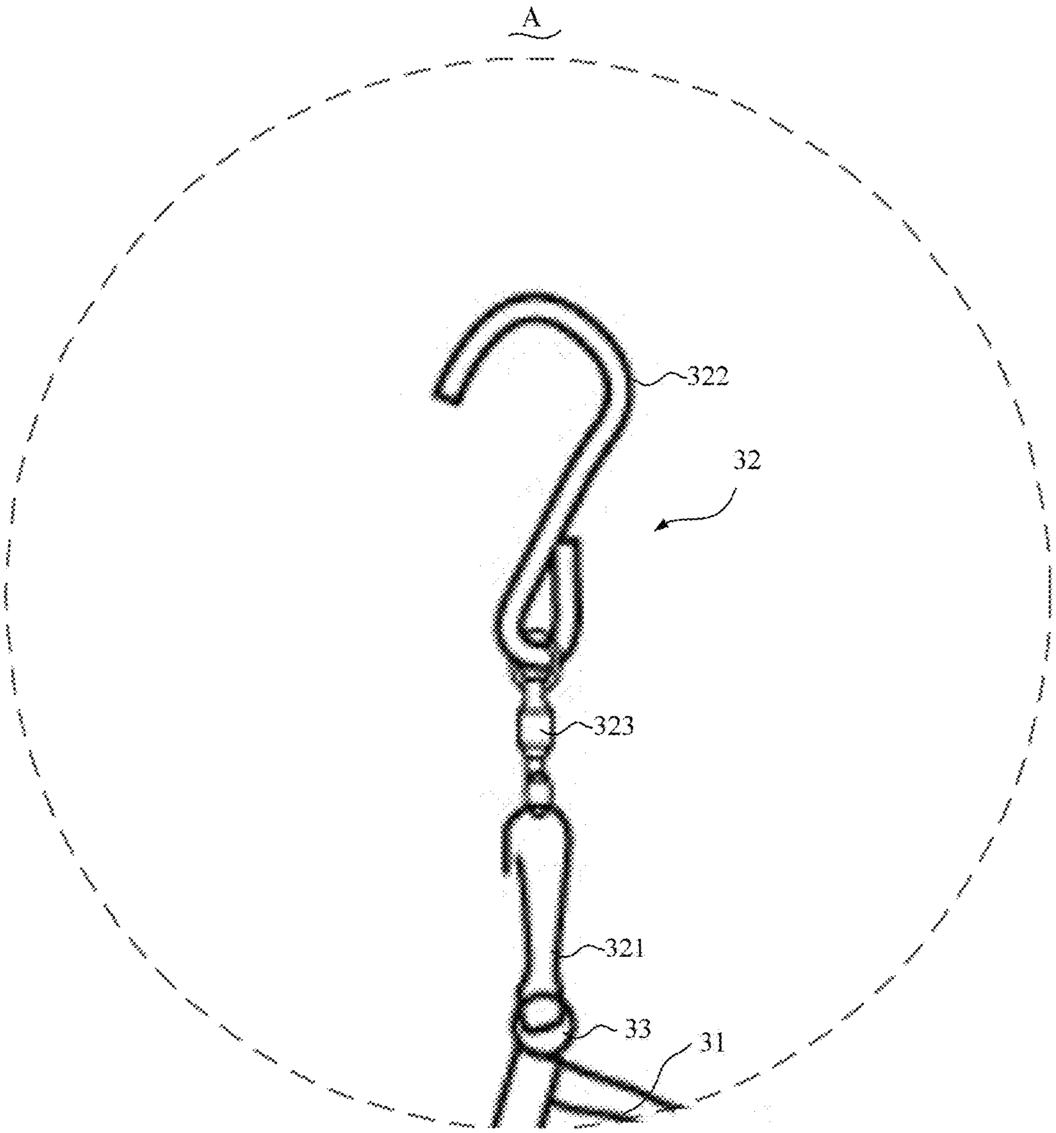
FIG. 6 is an enlarged schematic diagram of portion A shown in FIG. 1.

As shown in FIGS. 1 and 6, in some embodiments, the hanging assembly 30 comprises a hanging rope 31 and a hook 32. A first end of the hanging rope 31 is connected to an upper half portion of the central support 113. A second end of the hanging rope 31 is connected to a lower half portion of the central support 113. The hook 32 is connected to the hanging rope 31. Two opposite ends of the hanging rope 31 are respectively fixed to two opposite ends of the central support 113, and the hook 32 is fixed to the middle portion of the hanging rope 31. In this way, a stable triangle is formed, which effectively resists the external force and reduces the shaking or tilting of the decorative body 10 caused by hanging.

Furthermore, as shown in FIG. 6, the hanging assembly 30 further comprises an adjusting piece 33 slidably connected to the hanging rope 31, and the adjusting piece 33 is configured to fix the hook 32 at different positions of the hanging rope 31, so as to adjust a posture of the decorative body 10.

For example, when the decorative body 10 needs be roughly parallel to the ground at certain viewing angles, the hook 32 is fixed to the middle portion of the hanging rope 31 through the adjusting piece 33, so that the decorative body 10 presents a relatively horizontal posture. When the decorative body 10 needs to be tilted, the hook 32 is fixed to an upper half portion or a lower half portion of the hanging rope 31 through the adjusting piece 33. By changing a hanging point of the hook 32, the user is able to adjust a tilt direction and a tilt angle of the decorative body 10, so that the user has more choices and freedom in adjustment of the hanging assembly. The adjusting piece is a wire buckle, a clip, a clamp, or other slidable fixing device, which is not limited thereto.

As shown in FIG. 6, the hook 32 comprises a first hook body 321, a second hook body 322, and a rotating connector 323. The first hook body 321 is connected to the hanging rope 31, the second hook body 322 is connected to an external structure, and the rotating connector 323 connects the first hook body 321 to the second hook body 322, so that the first hook body 321 and the second hook body 322 are rotatable relative to each other. The first hook body 321 is a closed ring-shaped hook, the second hook body 322 is a hook structure with a notch, and the rotating connector 323 is a bearing or a hinge structure. For instance, the rotating connector 323 comprises an inner ring, an outer ring, and a rolling body, the inner ring is fixed to the first hook body 321, the outer ring is fixed to the second hook body 322, and the rolling body ensures that the first hook body 321 and the second hook body 322 being rotatable smoothly relative to each other. In this way, when the decorative body 10 rotates under the action of wind, the hook 32 itself rotates accordingly without restricting the movement of the decorative body 10, and further effectively prevents the hanging rope 31 from being entangled or knotted during a rotation process.

In some embodiments, the illumination piece 20 is a part of the pulling light string 4. Therefore, an electrical connection operation between the illumination piece 20 and the pulling light string 40. Specifically, the pulling light string 40 is at least disposed around an outer contour of the decorative body 10 and extends outward from the decorative body 10. At this time, the part of the pulling light string 40 disposed on the flexible wind-receiving layer 120 forms the illumination piece 20 and plays a role in lighting, while a part of the pulling light string extending outward from the decorative body 10 that is connected to the external structure plays a role in lighting and also plays a role in pulling the decorative body 10, so that the kite-shaped decorative lamp 1 presents a dynamic effect of flying in the air like a kite. In other embodiments, the illumination piece 20 is an LED lamp or an LED light strip, which is not limited thereto.

Figure 7:
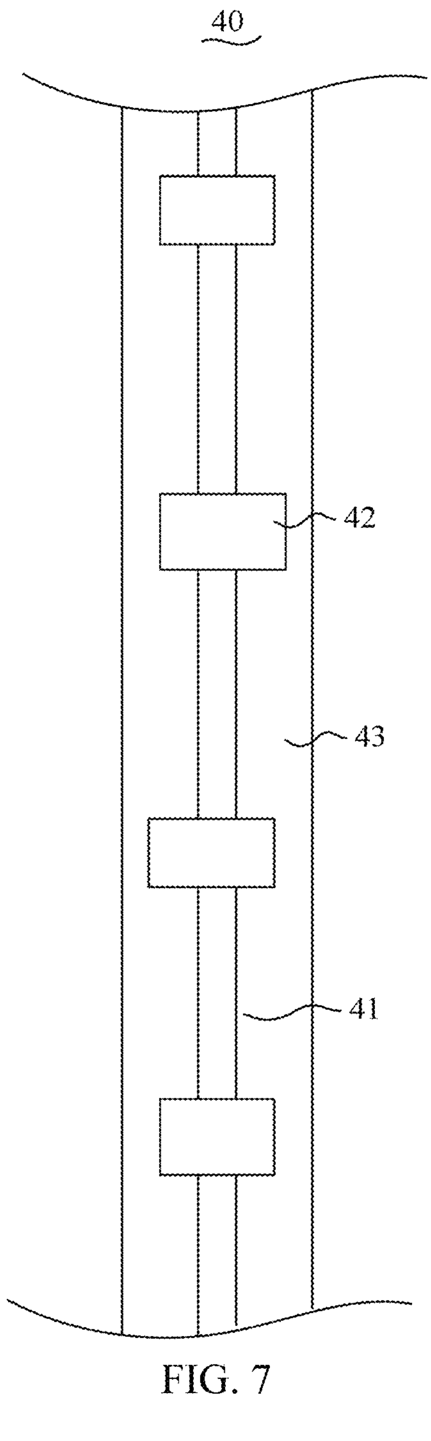
FIG. 7 is a schematic diagram of a pulling light string according to one embodiment of the present disclosure.

Furthermore, at least a portion of the flexible wind-receiving layer 120 connected to the pulling light string 40 is a double-layer structure. The pulling light string 40 is sandwiched between two layers of the double-layer structure. A receiving space is formed between the two layers of the double-layer structure, which is convenient for accommodating the pulling light string 40, and is able to wraps the pulling light string 40 to protect the pulling light string 40. The double-layer structure not only prevents the pulling light string from being physically damaged, but also prevents an influence of external factors such as dust and moisture on the pulling light string. Specifically, the flexible wind-receiving layer 120 is composed of two completely independent fabric layers, and the two fabric layers are connected together by, for example, bonding, sewing, hot pressing, etc. to form the receiving space configured to accommodate the pulling light string. In another embodiment, the flexible wind-receiving layer 120 is composed of a complete fabric layer and partial additional fabric layers. The complete fabric layer serves as a base, and the partial additional fabric layers serve as covering layers, and are fixed at specific positions on the complete fabric layer to form the double-layer structure. The pulling light string 40 is sandwiched between the complete fabric layer and the partial additional fabric layers As shown in FIG. 7, the pulling light string 40 comprises a conductive wire 41, light-emitting diode (LED) lamp beads 42, and a protective sleeve 43. The LED lamp beads 42 are disposed at intervals along an extension direction of the conductive wire 41. The protective sleeve 43 is sleeved outside the conductive wire and the LED lamp beads. The protective sleeve 43 plays the role of protection, insulation and waterproofing. The protective sleeve 43 is made of a silicone material, which has good flexibility, weather resistance, and corrosion resistance. The protective sleeve 43 effectively protects the conductive wire 41 and the LED lamp beads 42 from damage by the external environment. The pulling light string 40 has Ingress Protection 65 (IP65) protection and is able to cope with adverse weather conditions such as rain and snow, thereby extending the service life of the kite-shaped decorative lamp 1.

In order to control a light-emitting operation of the pulling lamp string 40, the kite-shaped decorative lamp 1 further comprises a control device 50. The control device 50 is electrically connected to the pulling lamp string 40 and is configured to control the light-emitting operation of the pulling lamp string 40. The control device 50 is configured to control a color of light emitted by the LED lamp beads 42 and/or a flashing frequency of the LED lamp beads 42. Specifically, the control device 50 is able to flexibly adjust the color of the LED lamp beads 42, thereby allowing the kite-shaped decorative lamp 1 to change colors as desired and creating a colorful visual effect. At the same time, the control device 50 further accurately controls the flashing frequency of the LED lamp beads 42, and the control device easily fast flashing or slow change of the LED lamp beads, which provide more dynamics and fun to the kite-shaped decorative lamp 1 and meet decorative lighting effects of different occasions and needs.

The kite-shaped decorative lamp 1 further comprises a battery 60. The battery 60 is configured to supply power to the control device 50 and the pulling light string 40. The battery 60 is a solar cell 60. In this way, the solar cell 60 makes full use of solar energy for charging, and provides continuous and stable power support for the control device 50 and the pulling light string 40. The solar cell 60 is not only environmentally friendly and energy-saving, but also eliminates a trouble of frequent battery replacement, making the kite-shaped decorative lamp 1 more convenient and practical, and suitable for use in various outdoor places or places where it is difficult to access power. Of course, in other embodiments, the kite-shaped decorative lamp 1 further comprises a plug connected to an external power source, and the plug is connected to the external power source to supply power to the control device 50 and the pulling light string 40.

In the drawings of the embodiments, the same or similar numbers correspond to the same or similar components; in the description of the present disclosure, it should be understood that terms such as “upper”, “lower”, “left”, “right”, etc. indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A kite-shaped decorative lamp, comprising:

a decorative body;

a hanging assembly;

a pulling light string;

wherein the hanging assembly is connected to an upper surface of the decorative body and is configured to hang the decorative body;

wherein an upper end of the pulling light string is connected to a lower surface of the decorative body, and a lower end of the pulling light string extends downward;

wherein the hanging assembly and the pulling lamp string jointly act on the decorative body to maintain a hovering posture of the decorative body;

wherein the decorative body comprises a flexible wind-receiving layer, the flexible wind-receiving layer comprises two wings, and the decorative body is capable of switching between an unfolded state and a folded state;

wherein in the unfolded state, free ends of the two wings are away from each other, and the flexible wind-receiving layer is unfolded to form a kite-shaped plane structure;

wherein in the folded state, the two wings are folded to form a multi-stage umbrella-shaped wrinkle structure.

2. The kite-shaped decorative lamp according to claim 1, wherein the decorative body comprises a foldable skeleton attached to the flexible wind-receiving layer;

wherein the foldable skeleton is configured to support or fold the flexible wind-receiving layer, a lower end of the hanging assembly is connected to the foldable skeleton, and the upper end of the pulling light string is connected to at least one of the foldable skeleton and the flexible wind-receiving layer.

3. The kite-shaped decorative lamp according to claim 1, wherein the foldable skeleton is approximately I-shaped and is axially symmetric, the foldable skeleton comprises a central support and a support frame, the central support extends in a vertical direction, the support frame comprises a front support structure and a rear support structure, the front support structure is connected to a first end of the central support, and the rear support structure is connected to a second end of the central support;

wherein the two wings are respectively disposed on two sides of the central support, the front support structure is configured to support or fold head portions of the two wings, the rear support structure is configured to support or fold tail portions of the two wings, and the hanging assembly is connected to the central support.

4. The kite-shaped decorative lamp according to claim 3, wherein the support frame comprises a front support and a rear support, a middle portion of the front support is detachably connected to the first end of the central support to form the front support structure, and a middle portion of the rear support is detachably connected to the second end of the central support to form the rear support structure.

5. The kite-shaped decorative lamp according to claim 3, wherein the foldable skeleton comprises a left support and a right support;

wherein the left support is bent to define a first support rod, a second support rod, and a third support rod, and the first support rod, the second support rod, and the third support rod are connected in sequence;

wherein the right support is bent to define a fourth support rod, a fifth support rod, and a sixth support rod, and the fourth support rod, the fifth support rod, and the sixth support rod are connected in sequence;

wherein the second support rod and the fifth support rod are disposed in parallel, the second support rod is fixed relative to the fifth support rod, and the first support rod and the fifth support rod jointly form the central support; an extension direction of the first support rod is opposite to an extension direction of the fourth support rod, and the first support rod and the fourth support rod jointly form the front support structure; an extension direction of the third support rod is opposite to an extension direction of the sixth support rod, and the third support rod and the sixth support rod jointly form the rear support structure.

6. The kite-shaped decorative lamp according to claim 3, wherein the hanging assembly comprises a hanging rope and a hook, a first end of the hanging rope is connected to an upper half portion of the central support, a second end of the hanging rope is connected to a lower half portion of the central support, and the hook is connected to the hanging rope.

7. The kite-shaped decorative lamp according to claim 6, wherein the hanging assembly further comprises an adjusting piece slidably connected to the hanging rope, and the adjusting piece is configured to fix the hook at different positions of the hanging rope, so as to adjust a posture of the decorative body.

8. The kite-shaped decorative lamp according to claim 6, wherein the hook comprises a first hook body, a second hook body, and a rotating connector;

wherein the first hook body is connected to the hanging rope, the second hook body is connected to an external structure, and the rotating connector connects the first hook body to the second hook body, so that the first hook body and the second hook body are rotatable relative to each other.

9. The kite-shaped decorative lamp according to claim 1, wherein the foldable skeleton is made of a metal or an alloy having a shape memory characteristic, so that the decorative body is capable of switching between the unfolded state and the folded state.

10. The kite-shaped decorative lamp according to claim 9, wherein the foldable skeleton comprises any one of iron wires, aluminum wires, copper wires and silver wires.

11. The kite-shaped decorative lamp according to claim 2, wherein a connection method of the flexible wind-receiving layer and the foldable skeleton comprises a bonding connection, a sewing connection, a fastener connection, a Velcro connection, or a zipper connection.

12. The kite-shaped decorative lamp according to claim 2, wherein the kite-shaped decorative lamp further comprises an illumination piece, the illumination piece is a part of the pulling light string, and the part of the pulling light string disposed on the decorative body is configured as the illumination piece.

13. The kite-shaped decorative lamp according to claim 12, wherein at least a portion of the flexible wind-receiving layer connected to the pulling light string is a double-layer structure, and the pulling light string is sandwiched between two layers of the double-layer structure.

14. The kite-shaped decorative lamp according to claim 12, wherein the pulling light string is at least disposed around an outer contour of the decorative body.

15. The kite-shaped decorative lamp according to claim 12, wherein the kite-shaped decorative lamp further comprises a control device, and the control device is electrically connected to the pulling lamp string and is configured to control a light-emitting operation of the pulling lamp string.

16. The kite-shaped decorative lamp according to claim 15, wherein the pulling light string comprises a conductive wire, light-emitting diode (LED) lamp beads, and a protective sleeve;

wherein the LED lamp beads are disposed at intervals along an extension direction of the conductive wire, and the protective sleeve is sleeved outside the conductive wire and the LED lamp beads.

17. The kite-shaped decorative lamp according to claim 16, wherein the control device is configured to control a color of light emitted by the LED lamp beads and/or a flashing frequency of the LED lamp beads.

18. The kite-shaped decorative lamp according to claim 15, wherein the kite-shaped decorative lamp further comprises a battery, and the battery is configured to supply power to the control device and the pulling light string.

19. The kite-shaped decorative lamp according to claim 18, wherein the battery is a solar cell.

* * * * *